United States Patent [19]
Lamont et al.

[11] 3,796,562
[45] Mar. 12, 1974

[54] PROCESS OF MANUFACTURING A PESTICIDAL ACTIVE WETTABLE POWDER AND PRODUCTS

[75] Inventors: John Lamont, Concord; Ralston Curtis, Ross, both of Calif.

[73] Assignee: Stauffer Chemical Company, Westport, Conn.

[22] Filed: Jan. 25, 1971

[21] Appl. No.: 109,548

[52] U.S. Cl.................. 71/93, 71/100, 71/DIG. 1
[51] Int. Cl................................................ A01n 9/22
[58] Field of Search............................ 71/100, 93

[56] References Cited
UNITED STATES PATENTS
3,037,853   6/1962   Luckenbaugh .................. 71/100

Primary Examiner—James O. Thomas, Jr.
Attorney, Agent, or Firm—Daniel C. Block

[57] ABSTRACT

A wettable powder pesticide formulation composition and the process of manufacturing the same is described herein. The composition is a combination of a liquid N,N-alkyl-thiocarbamate herbicide and a solid s-triazine herbicide on a solid carrier that do not readily separate when mixed with water.

9 Claims, No Drawings

PROCESS OF MANUFACTURING A PESTICIDAL ACTIVE WETTABLE POWDER AND PRODUCTS

BACKGROUND OF THE INVENTION

In the art of manufacturing a wettable powder having an active pesticidal component, it is the usual practice to intimately mix together finely divided solid carrier, solid dispersing agent and solid surface active or wetting agent. If the pesticidal active component is a solid, it is merely sized and mixed with the other solid components. If the pesticidal active component is a liquid, it is usually spray incorporated with the solid components.

In recent years, attempts have been made to employ a dual system formulation containing at least two different pesticidal active compounds as the pesticidal active component in the wettable powder. One such attempt was to combine herbicidal active liquid thiocarbamates with the herbicidal active solid s-triazines and formulate them into a wettable powder. The physical properties of the wettable powder appeared to be satisfactory. However, when the wettable powder is combined with water, the thiocarbamate compound separated to form a layer on top of the water. In particular, this problem is intensified when attempting to provide relatively high loading of the active compounds. This separation of the active compounds causes nonuniform distribution thereof when applied to the habitat of the pest to be controlled which can not be tolerated in normal application.

DESCRIPTION OF THE INVENTION

The present invention is directed to the process of manufacturing a wettable powder having at least two pesticidal active compounds incorporated therein. The process involves the combination of a liquid pesticide with a solid pesticide in such a way that the two active compounds will not readily separate when the powder is combined with water. Thus, an N,N-alkyl thiocarbamate is combined with an emulsifying agent to form a concentrate. The thiocarbamates useable with the present invention are described and claimed in U.S. Pat. No. 2,913,327. In particular, the compounds S-ethyl-N,N-diisobutylthiocarbamate and S-ethyl-N,N-dipropylthiocarbamate are advantageously used. The emulsifying agent can be the polyoxy-ethylene sorbitan monolaurate ether of alkylated phenols blended with organic sulfonates. The amount of emulsifying agent present can range between about 1 and 25 percent by weight of the thiocarbamate.

After the liquid concentrate has been formed, it is incorporated with a solid material that contains a solid pesticidal active compound. The solid material can be described as a finely divided solid carrier having mixed therewith a finely divided solid dispersing agent, a finely divided solid wetting agent and a finely divided solid pesticidal active compound. The solid carrier can be finely divided synthetic calcium silicate. The dispersing agent can be any conventional material but preferably is a sodium salt of a condensed arylsulfonic acid. The dispersing agent can be present in an amount ranging between about 0.5 to about 10 percent by weight of the solid carrier. The wetting agent can be a conventional material but preferably is sodium-N-methyl-N-oleoyl taurate and can be present in an amount ranging between about 0.5 to about 5 percent by weight based on the carrier material. The active solid pesticide compound can be any one of those compounds described and claimed in U.S. Pat. No. 2,891,855, but preferably technical or wettable powder 2-chloro-4-ethylamino-6-isopropylamino-s-triazine. The active compound can be present in an amount ranging between about 10 and 60 percent by weight of solid carrier. These compounds are commercially available.

These solid materials are intermixed together and thoroughly blended to form a uniformly blended powder. Thereafter, the liquid emulsifiable concentrate is incorporated within the solid materials in any conventional manner, preferably by spray incorporation into a moving bed of the solid materials. The amount of liquid pesticide incorporated within the solid materials can range between about 10 and 60 percent by weight of the total with the solid active pesticidal compound ranging between about 10 and 30 percent by weight of the total mass. After the liquid has been incorporated with the solid, the combination is thoroughly blended with a suitable apparatus such as a ribbon blender to produce a uniform wettable powder.

In order to illustrate the merits of the present invention, reference is made to the following examples:

EXAMPLE 1

A wettable powder was formulated having the following ingredients:

| | Wt.% |
|---|---|
| 1. S-ethyl-N,N-diisobutylthiocarbamate (98% technical grade) | 37.07 |
| 2. 2-chloro-4-ethylamino-6-isopropylamino-s-triazine (80% wettable powder) | 15.15 |
| 3. emulsifying agent (polyoxy-ethylene sorbitan monolaurate ether of alkylated phenols blended with organic sulfonates) | 2.10 |
| 4. dispersing agent (a sodium salt of a condensed arylsulfonic acid) | 2.10 |
| 5. wetting agent (sodium-N-methyl-N-oleoyl taurate) | 2.30 |
| 6. solid carrier (synthetic calcium silicate) | 41.28 |

The above-noted wettable powder formulation was made by adding the solid 2-chloro-4-ethylamino-6-isopropylamino-s-triazine, solid dispersing agent, solid wetting agent and solid carrier to a cylindrical glass vessel with a hemispherical bottom. These solid ingredients are then mixed with a 5/16 inch diameter rod equipped with a flexible chain at the bottom end and driven by a speed control motor until a free-flowing motion is obtained in the powder bed without aerating or dusting the material. Then, the S-ethyl-N,N-diisobutylthiocarbamate and emulsifying agent are blended into a solution which is then slowly added manually to the moving bed of powdered materials using a medicine pipet dropper. After all the liquid ingredients are added, agitation of the mixture is continued until a free-flowing powder is obtained which has excellent distribution of the active pesticides throughout the product. When this composition is added to water in the conventional manner, a wetting time of 30 seconds is provided for 5 grams of product per 100 ml. of water. The final product is a well-dispersed suspension.

EXAMPLE 2

Example 1 was repeated in its entirety except the emulsifying agent was omitted. The wettable powder composition appeared free flowing as in Example 1.

However, upon adding the composition to water in the conventional manner, the S-ethyl-N,N-diisobutylthiocarbamate readily separated and formed a layer on top of the water.

EXAMPLE 3

Example 2 was repeated in its entirety except the order of addition was altered. In this instance, the S-ethyl-N,N-diisobutylthiocarbamate and 2-chloro-4-ethylamino-6-isopropylamino-s-triazine were blended together to form a uniform mixture. Thereafter, this mixture was added to the solid carrier, solid wetting agent and solid dispersing agent. Upon addition of this composition to water, the thiocarbamate compound separated immediately and formed a layer on top of the water.

EXAMPLE 4

Example 1 was repeated in its entirety except the amount of thiocarbamate was increased to 44.5% by weight and the s-triazine was increased to 17.8%. Upon addition of this composition to water, a uniform blend resulted.

As can be seen from the above examples, it is essential to the practice of the present invention to combine an emulsifying agent with a liquid thiocarbamate which is then combined with the solid s-triazine, solid dispersing agent, solid wetting agent and solid carrier in order to achieve a useable wettable powder wherein the herbicidal active compounds do not readily separate upon adding the composition to water.

What is claimed is:

1. A process of manufacturing a wettable powder pesticidal active composition comprising the steps of:

a. intimately blending together a pesticidal active s-triazine, a finely divided solid dispersing agent, a finely divided solid wetting agent, and a finely divided solid carrier;

b. forming a solution of an emulsifying agent and an N,N-dialkylthiocarbamate;

c. adding the solution formed in step b. to a moving bed of the solid material of step a. until a finely divided uniform blend is formed.

2. The process as set forth in claim 1 wherein the N,N-alkylthiocarbamate is S-ethyl-N,N-diisobutylthiocarbamate.

3. The process as set forth in claim 1 wherein the s-triazine is 2-chloro-4-ethylamino-6-isopropylamino-s-triazine.

4. The process as set forth in claim 1 wherein the emulsifying agent is polyoxy-ethylene sorbitan monolaurate ether of alkylated phenols blended with organic sulfonates.

5. The process as set forth in claim 1 wherein said dispersing agent is a sodium salt of a condensed arylsulfonic acid.

6. The process as set forth in claim 1 wherein the wetting agent is sodium-N-methyl-N-oleoyl taurate.

7. The process as set forth in claim 1 wherein said solid carrier is finely divided synthetic calcium silicate.

8. The process as set forth in claim 1 wherein said thiocarbamate is present in an amount ranging between about 10 and 60 percent by weight.

9. The process as set forth in claim 1 wherein said s-triazine is present in an amount ranging between about 10 and 30 percent by weight.

* * * * *